US008985528B2

(12) United States Patent
Colvin

(10) Patent No.: US 8,985,528 B2
(45) Date of Patent: Mar. 24, 2015

(54) CABLE SUPPORT AND METHOD FOR USING SAME

(75) Inventor: Douglas Colvin, The Woodlands, TX (US)

(73) Assignee: Colvin Industries, LLC, Houston, TX (US)

( * ) Notice: Subject to any disclaimer, the term of this patent is extended or adjusted under 35 U.S.C. 154(b) by 31 days.

(21) Appl. No.: 13/451,064

(22) Filed: Apr. 19, 2012

(65) Prior Publication Data

US 2012/0267483 A1 Oct. 25, 2012

Related U.S. Application Data

(60) Provisional application No. 61/476,811, filed on Apr. 19, 2011.

(51) Int. Cl.
*F16L 3/00* (2006.01)
*H02G 3/00* (2006.01)
*H02G 3/30* (2006.01)

(52) U.S. Cl.
CPC . *H02G 3/263* (2013.01); *H02G 3/30* (2013.01)
USPC ............... 248/62; 248/68.1; 248/58; 248/63; 248/61; 248/49; 52/39; 52/220.1; 52/220.7; 174/491; 174/43; 174/40 R; 361/826

(58) Field of Classification Search
USPC ............... 248/62, 68.1, 58, 61, 49, 63; 52/39, 52/220.1, 220.7; 174/491, 43, 40 R; 361/826
See application file for complete search history.

(56) References Cited

U.S. PATENT DOCUMENTS

| 429,357 | A | * | 6/1890 | McBee | 248/68.1 |
|---|---|---|---|---|---|
| 591,249 | A | * | 10/1897 | Emery | 248/58 |
| 2,120,805 | A | * | 6/1938 | Houser et al. | 122/510 |
| 2,854,824 | A | * | 10/1958 | Curry et al. | 405/302.1 |
| 3,334,851 | A | * | 8/1967 | Cassidy et al. | 248/68.1 |
| 3,556,447 | A | * | 1/1971 | Jenkins et al. | 248/62 |
| 3,576,305 | A | * | 4/1971 | Welsh et al. | 248/68.1 |
| 3,633,857 | A | * | 1/1972 | Logan | 248/62 |
| D263,021 | S | * | 2/1982 | Siegfried | D8/373 |
| 4,573,652 | A | * | 3/1986 | Richards | 248/74.1 |
| 5,199,675 | A | * | 4/1993 | DeGuchi | 248/62 |
| 5,740,994 | A | * | 4/1998 | Laughlin | 248/68.1 |
| 5,779,198 | A | * | 7/1998 | Rutherford et al. | 248/58 |
| 6,198,047 | B1 | * | 3/2001 | Barr | 174/68.3 |
| 6,325,338 | B1 | * | 12/2001 | Del Re et al. | 248/69 |
| 6,364,255 | B1 | * | 4/2002 | Carrick et al. | 248/49 |
| 6,494,411 | B1 | * | 12/2002 | Bjorklund | 248/49 |
| 6,629,675 | B1 | * | 10/2003 | Bjorklund et al. | 248/49 |
| 7,470,867 | B1 | * | 12/2008 | Cope et al. | 174/480 |
| 7,484,697 | B1 | * | 2/2009 | Nelson | 248/62 |
| 7,543,606 | B2 | * | 6/2009 | Friedline et al. | 138/106 |
| 8,294,030 | B2 | * | 10/2012 | Pollard, Jr. | 174/155 |

* cited by examiner

*Primary Examiner* — Christopher Garft
(74) *Attorney, Agent, or Firm* — Mark A. Oathout; Oathout Law Firm

(57) ABSTRACT

Embodiments described herein comprise a cable system. The cable system has a plurality of cables and a plurality of cable hangers. The cable hangers are configured to support the plurality of cables in a building. The plurality of cable hangers have one or more cable supports configured to hold at least one of the plurality of cables and a support configured to couple the cable support to the building.

15 Claims, 5 Drawing Sheets

CABLE SUPPORT AND METHOD FOR USING SAME

CROSS-REFERENCE TO RELATED APPLICATIONS

Figure 1:
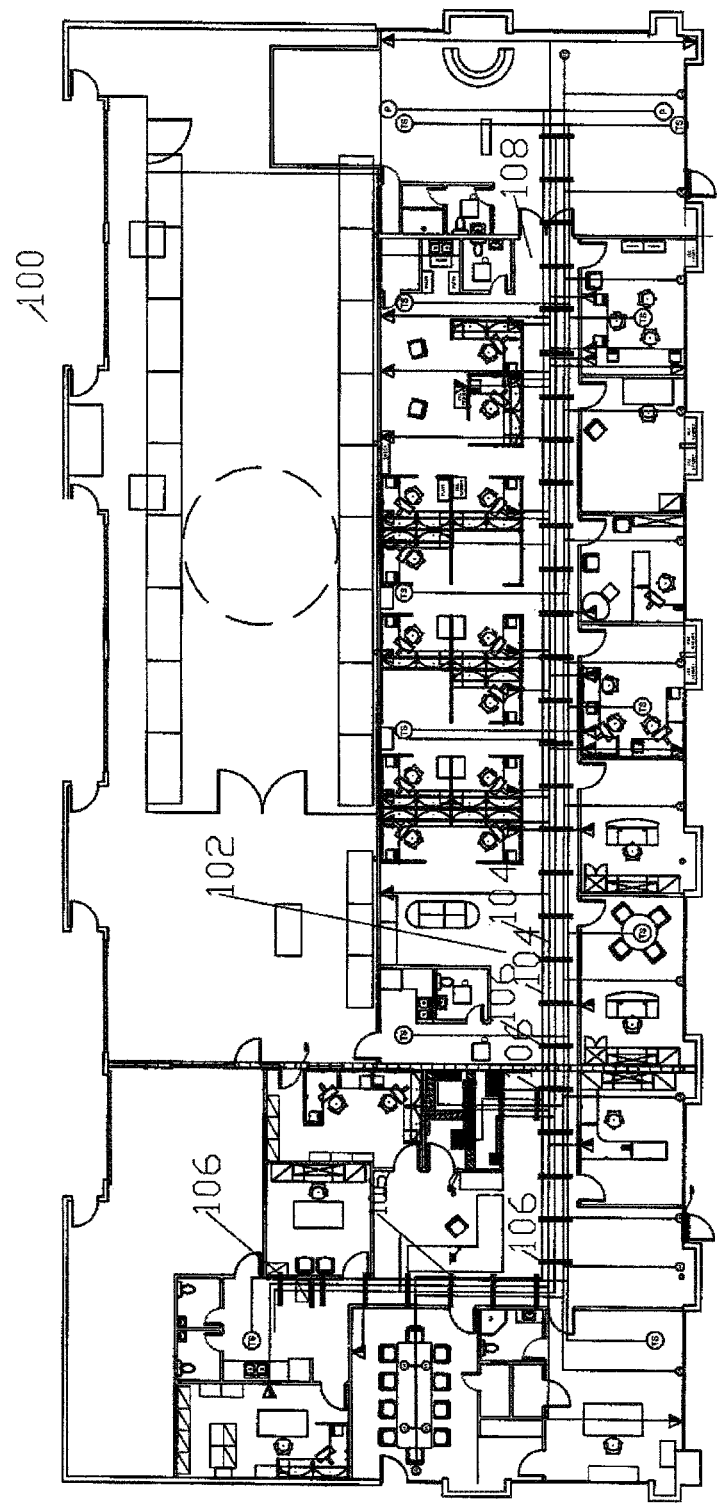

This application claims the benefit of U.S. Provisional Application No. 61/476,811 filed Apr. 19, 2011.

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A "SEQUENCE LISTING", A TABLE, OR A COMPUTER PROGRAM

Not Applicable.

BACKGROUND

Cables such as communication cables and electrical cables may be placed in walls, floors and ceilings during the construction of a building, a house, and/or an outdoor space. The cables are often installed by separate contractors. The separate contractors often place the cables in building in a disorganized and haphazard manner. The contractors typically have little guidance on what route to take the cables in the building. There is a need for a system and method for organizing cables in a building.

BRIEF DESCRIPTION OF THE SEVERAL VIEWS OF THE DRAWING(S)

Figure 2:
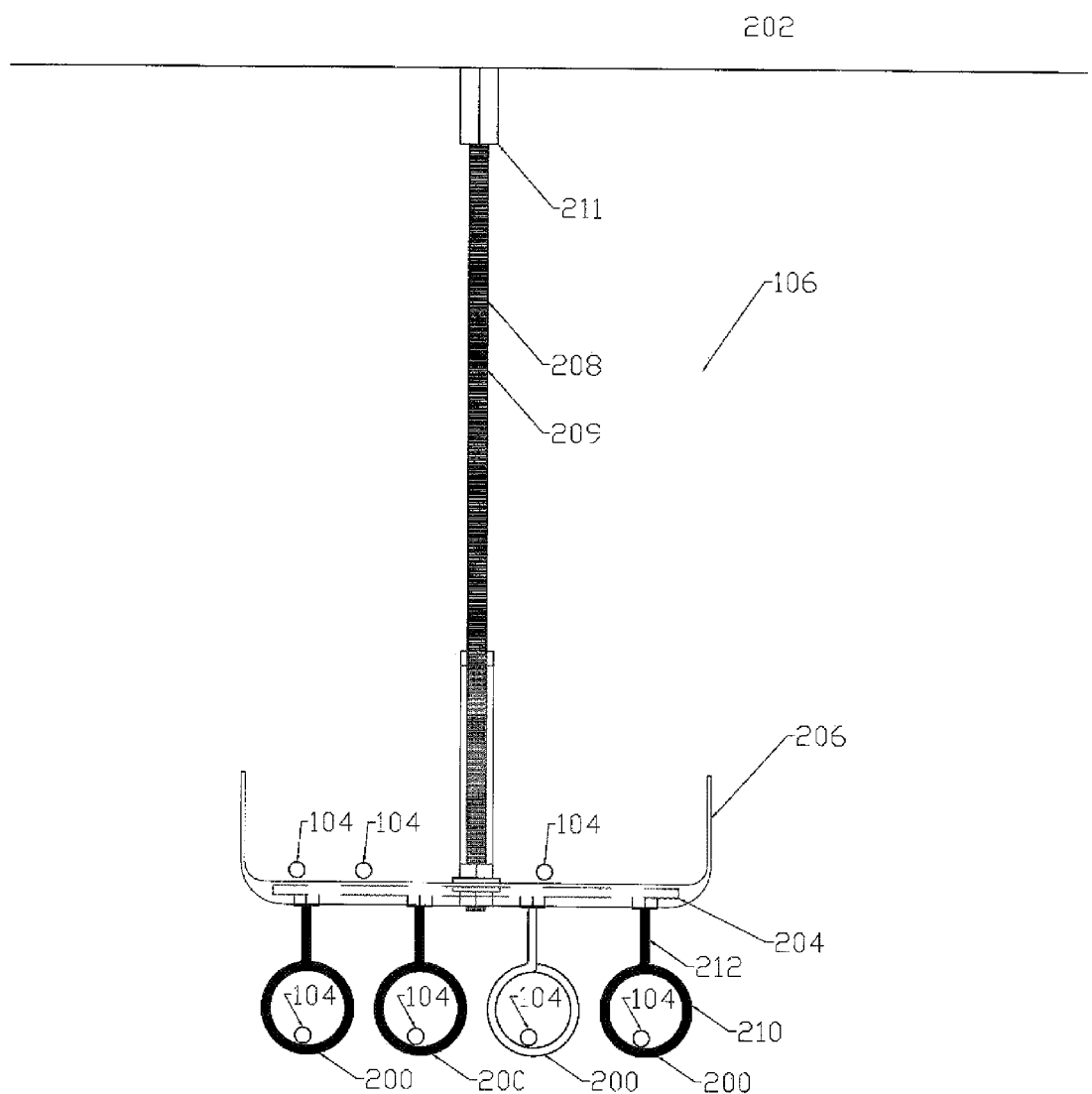
Figure 3:
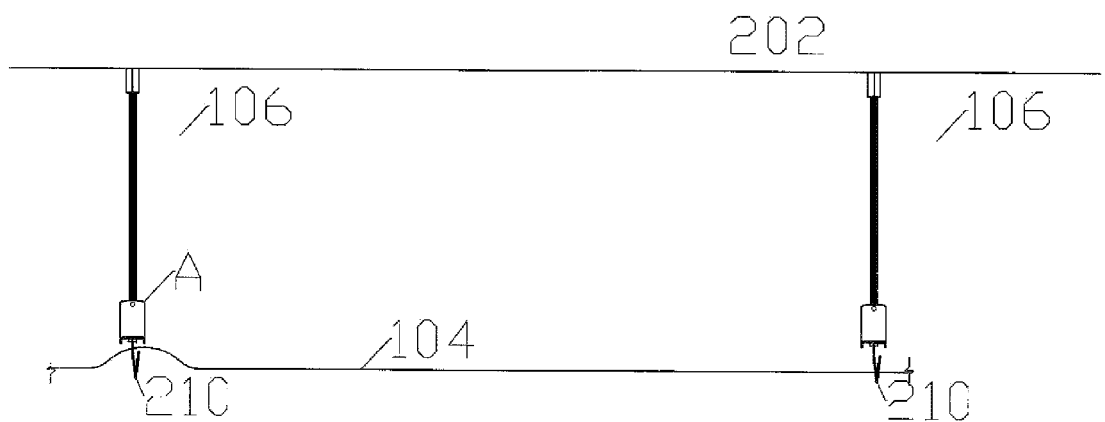
Figure 4:
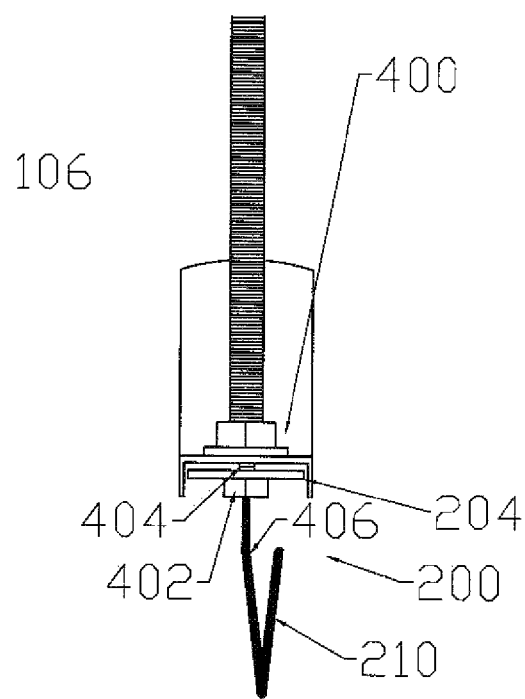
Figure 5:
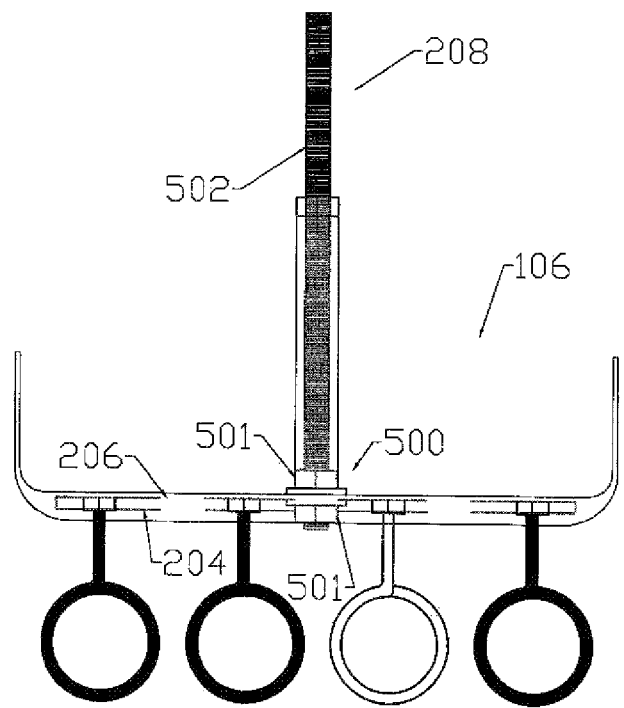
Figure 6:
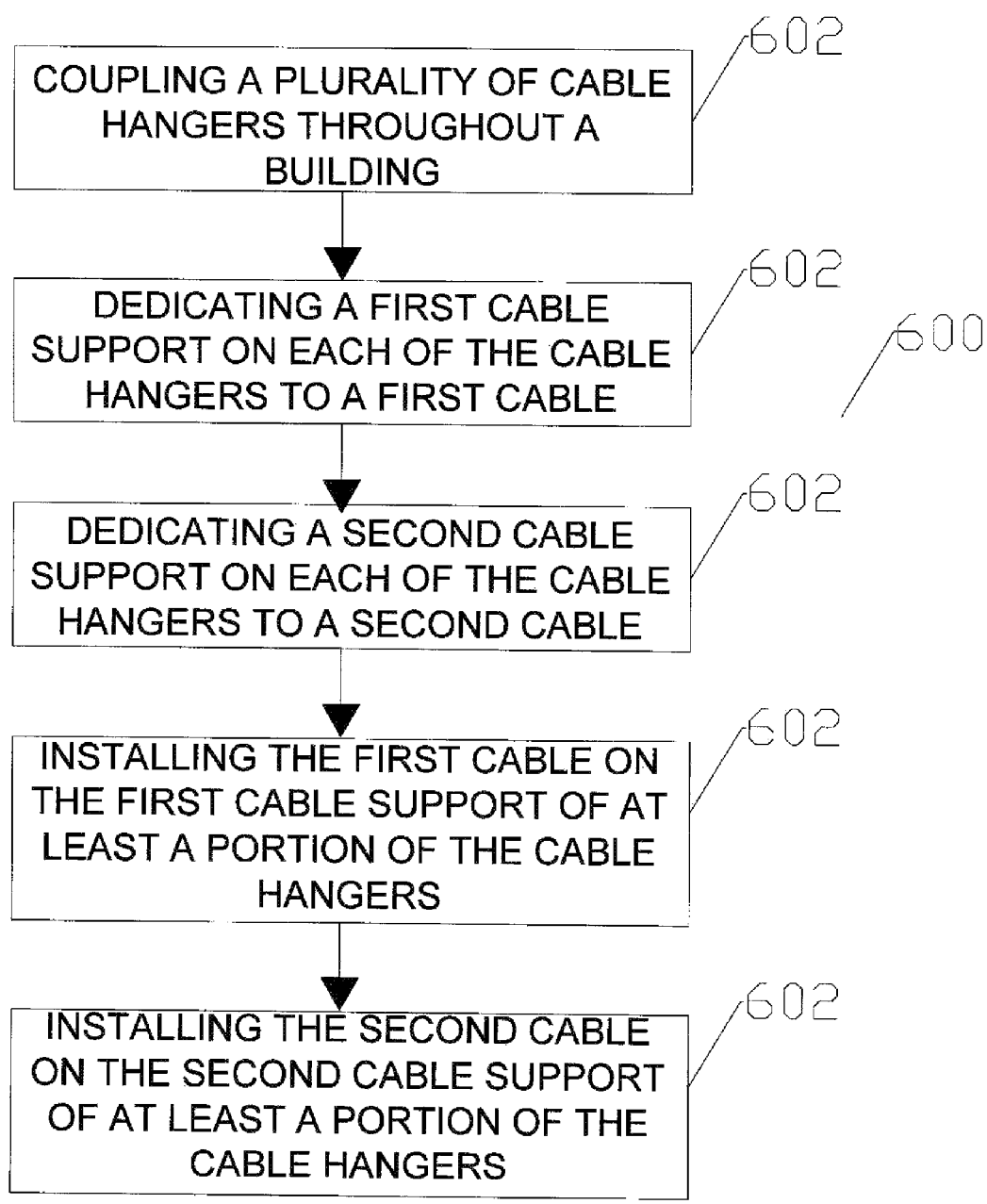

FIG. 1 depicts a schematic plan view of a building having a cable hanging system.
FIG. 2 depicts a front view of a cable hanger.
FIG. 3 depicts a side view of two of the cable hangers.
FIG. 4 depicts a side view of a portion of the cable hanger.
FIG. 5 depicts a front view of a portion of the cable hanger.
FIG. 6 depicts a method for installing cable.

DETAILED DESCRIPTION OF PREFERRED EMBODIMENT(S)

The description that follows includes exemplary apparatus, methods, techniques, and instruction sequences that embody techniques of the inventive subject matter. However, it is understood that the described embodiments may be practiced without these specific details.

FIG. 1 depicts a schematic plan view of a building 100 having a cable hanging system 102. The cable hanging system 102 may be configured to provide a pathway and support for a plurality of cables 104 in the building. The plurality of cables 104 may be for any cabling used in a building, office, outdoor space, warehouse, and/or home. The cable hanging system 102 may comprise a plurality of cable hangers 106 coupled to the building 100. Each of the cable hangers 106 has a plurality of cable supports 200 (as shown in FIG. 2). Each of the cable supports 200 may be dedicated to a specific type of cable 104. Therefore, the installers of the cables 104 may simply hang the cables 104 they are installing in the dedicated support of the pre-hung cable support 200. The cable hanging system 102 allows multiple disciplines of cabling companies to hang their cabling in a predetermined location, or pathway throughout the building 100.

The cables 104 may any suitable cables and/or transmission lines that could be used in the building. For example the cables 104 may be any suitable communication cabling system, transmission lines, electric lines, pneumatic systems, hydraulic systems, plumbing systems, gaseous systems, and the like. The communication cabling system may include, but are not limited to voice systems, data systems, fire Alarm systems, Electronic Access Control and Intrusion systems, Electronic Detection and Alarm systems, Closed circuit television systems (CCTV), Master Antenna Television Systems, Building Automation Systems (BAS), Audio Video systems (A/V), Sound/privacy masking systems, Patient Monitoring and Telemetry Communications systems, Nurse Call and Intercom Communications systems, Healthcare Communications and Monitoring systems, Paging Communications systems, Transportation Information Display systems, Public Information systems, Intermediate Frequency/Radio Frequency Communications systems, Antennas Communications systems, Grounding and Bonding systems, Electronic Digital systems, Point of Sale systems, Clock Systems, Infrared and Radio Frequency Tracking Systems, Internal Cellular, Paging, and Antenna Systems, Wireless Receivers and Transceivers Systems, Assistive Listening Systems, Electronic Surveillance systems, Electronic Detection and Alarm systems, Electronic Monitoring and Control systems and the like. The pneumatic systems may include, but are not limited to, temperature controls, control valves, instrument air, HVAC devices, and the like. The gaseous systems may include, but are not limited to, medical oxygen, nitros, and the like.

The cables 104 of the cabling system may be any suitable communication medium including, but not limited to, optical cable, copper cable, conduit, metal wire, speaker wire, telephone wire, coaxial cable, any conveyance device described herein, voice and data (V/D) cables, security (SEC) cable, a building automation system (BAS), audio video (A/V) cable, fire alarm cable (F/A), and the like. The cables 104 of the pneumatic system may be any suitable devices for transferring gasses including, but not limited to, tubing, piping, hoses, flex hose, piping systems including valves and control system, tubing systems including valves and control systems, any conveyance device described herein, and the like. The cables 104 of the gaseous system may include, but are not limited to, tubing, piping, flex hose, any conveyance device described herein, and the like. The cables 104 in the hydraulic system may be any suitable device for conveying hydraulic fluid including, but not limited to hydraulic lines, any conveyance described herein, and the like. The cables 104 of the plumbing system may be any suitable device for conveying fluids including, but not limited to, piping, PVC pipe, tubing, any conveyance described herein and the like.

The building 100 as shown is an office building; however, it should be appreciated that the building 100 may be any structure that requires cables including, but not limited to, a house, a high rise, a hospital, a hotel, an educational facility, an outdoor space, a warehouse, and the like. As shown, the cable hangers 106 installed at spaced intervals along one or more pathways 108 through the building 100. The pathways 108 may be predetermined routes that the cables 104 will take between the end, or final connection point of the cables 104. As shown, the pathways 108 provide cable 104 access to a large portion of the building 100.

The cable hangers 106 may be spaced at any acceptable interval that allows for the cables 104 to be adequately supported. In an example the cable hangers 106 are spaced five (5) feet apart along the pathways 108, although it should be appreciated that the intervals may be greater than or less than five feet and/or may vary from one cable hanger 106 to the next.

FIG. 2 depicts a view of the cable hanger 106 installed in a ceiling 202 of the building 100. The cable hanger 106 as shown has four cable supports 200 coupled to a bar 204. The bar 204 and/or the u-support bracket 206 may couple to a support hanger 208. As shown, the support hanger 208 is a threaded rod 209 that may be coupled directly to the ceiling. The threaded rod may vary in length depending on the requirements of the job. Coupling the support hanger 208 to the ceiling may be accomplished in any suitable manner. As shown, the threaded rod 209 is screwed into a rod coupling 211 coupled to the ceiling 202 although any suitable method may be used to couple the support hanger 208 to the building 100 including, but not limited to, bolts, screws, brackets, nails, any combination thereof, and the like. Although, the cable hanger 106 is shown couple to the ceiling 202, it should be appreciated that the cable hanger 106 may couple to any suitable surface including, but not limited to, open ceilings, closed ceilings, attics, crawl spaces, exposed areas, under floor spaces (raised floor), and the like.

The cable supports 200 may be a continuous ring coupled to a rod in an embodiment. In another embodiment, the cable supports 200 may be an open ring 210 integral with a rod 212 that couples to the bar 204. The open ring 210 may allow an installer to place the cable on the support hanger 208 without the need to string, or thread, an end of the cable through the ring. Thus, the installer may simply place the middle of the cable through the open end of the open ring 210 and place the cable on the bottom of the open ring 210. Further, it should be appreciated that any suitable shaped cable support 200 may be used for supporting the cables 104 including, but not limited to, hooks, eye hooks, bags, loops, j-bolts, u-bolts, and the like. The rings may be sized to suit the job. In one example, the rings may come in 2" diameter and 4" diameter sizes. Four cable supports 200 are shown; although it should be appreciated that any number of cable supports 200 may be used. In addition to placing cabling in the cable supports 200, cables 104 may be placed in the u-shaped bracket 206.

In an additional and/or alternative embodiment, the cable supports 200 and/or the U-support bracket 205 may have a wide contact surface for supporting the cable 104. The wide contact surface may allow for a larger surface to support the cable 104 at each of the cable supports 200. The larger surface may prevent and/or eliminate pinching, and/or over bending, of the cable 104 at the support 200. Some cables 104, for example Cat 6 copper cable, may require a wider throat (or wide contact surface) at the cable support 200 and/or the u-shaped support 206 to eliminate pinch or crimping of the cable at the support 200 and/or 206. One or more of the cable supports 200 may have the wide contact surface.

Each of the cables 104, or cable types, may be specifically dedicated to one of the cable supports 200 along the pathway 108 (shown in FIG. 1). For example, the cable supports 200 for a specific cable 104 (for example audio/video cables) may have a specific indicator to tell the installers the specific cable 104 should be supported by the corresponding cable support 200. The indicator may be a color coated of all or a portion of the cable support 200. Further any suitable indicator may be used including, but not limited, letters, numbers, size or style of the cable supports 200, engraving, stamping, any combination thereof, and the like.

FIG. 3 depicts a side view of two cable hangers 106 installed in the ceiling 202. As can be seen from the side view, the open ring 210 allows the cable 104 to be placed on the support hanger 208 in the middle of the cable 104, as shown at location A. This greatly reduces installation time.

FIG. 4 depicts a side view of a portion of the cable hanger 106 depicting a connector 400 between the bar 204 and the cable support 200. The connector 400 as shown is a two nuts 402 threaded to threads 404 on the rod 212 of the cable support 400. Although the connector 400 is shown as nuts 402 it should be appreciated that the connector 400 may be any suitable connector including, but not limited to, a pin, a bracket, and the like.

The open ring 210 of the cable support 200 may be slightly offset, due to the coil 406 of the open ring 210 as shown in FIG. 5. This offset allows the contractor to easily place the middle of the cable past the open end of the coil 406 of the open ring 210. Therefore the contractor does not need to thread the cable 104 through the center of the open ring 210.

FIG. 5 depicts a front view of a portion of the cable hanger 106 depicting a rod connection 500 between the rod 208 and the bar 204 and/or u-support bracket 206. The rod connection 500 as shown is two nuts 501 threaded to rod threads 502 of the hanger rod 208, although it should be appreciated that any suitable connector may be used including, but not limited to, those described herein.

FIG. 6 depicts a method 600 for installing a cable system in a building. The method begins at block 602 wherein a plurality of cable hangers are coupled throughout a building. The method continues at block 604 wherein a first cable support on each of the cable hangers is dedicated to a first cable. The method continues at block 606 wherein a second cable support on each of the cable hangers is dedicated to a second cable. The method continues at block 608 wherein the first cable is installed on the first cable support of at least a portion of the cable hangers. The method continues at block 610 wherein the second cable is installed on the second cable support of at least a portion of the cable hangers.

The cable hanger 106 may be an assembly designed to eliminate the need for numerous individual installations of cable supports for open-air cabling. The cable hanger 106 and cable hanger system 102 will organize what is typically disorganized and unplanned wiring in the ceiling. The cable hanger system 102 will save money because an installer can build and install the cable hanger 106 in less time and expense than five separate disciplines of subcontractors can. For example five disciplines may include the high-speed voice and data cabling resting in the 12" wide U-bracket, or the u-support bracket 206, and the other 4 disciplines may reside in the four rings below, as shown in FIG. 2.

The cable hanger system 102 saves labour time by reducing labour hours by installing one assembly (one assembly vs. numerous hangers). Cable hanger system 102 reduces risk of injuries by reducing man hours of work off ladders and power actuated tools. The cable hanger system 102 reduces product cost by reducing quantity of materials required to accomplish same tasks (one assembly vs. numerous hangers) and reducing raw materials needed for jobsite (one assembly vs. numerous hangers). The system may assist owners and builders with LEED credits. The cable hanger system 102 allows all low voltage disciplines to be installed in a methodical and organized manner. The cable hanger system 102 keeps all disciplines from crossing each other and being installed at different elevations and allows for reduced cost on moves, adds and changes (MAC). This system allows for a permanent support assembly dedicated to each discipline with future growth engineered into the system. The cable hanger system 102 allows for the elimination of many disciplines of subcontractors installing supports in ceilings.

While the embodiments are described with reference to various implementations and exploitations, it will be understood that these embodiments are illustrative and that the scope of the inventive subject matter is not limited to them. Many variations, modifications, additions and improvements are possible. For example, the techniques used herein may be applied to any valve used for piping systems, such as a ball valve.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A cable system, comprising:
    a plurality of cables;
    a plurality of cable hangers configured to support the plurality of cables in a building, the plurality of cable hangers comprising:
        a plurality of cable supports configured to hold at least one of the plurality of cables wherein the cable supports comprise:
            an open coiled ring having a spiral shape that surrounds the supported plurality of cables and an open end that allows the cables to be installed into the open coiled ring without moving the open coiled ring and wherein the open coiled ring loosely supports each of the plurality of cables directly on the open coiled ring;
            a rod having a terminal end and a ring end wherein the rod extends from the ring end perpendicularly relative to a central axis of the open coiled ring;
        a unitary bar having an elongated straight portion extending perpendicular to and coupled to the terminal end of each of the rods, wherein the unitary bar further has two supports forming a U-shaped bracket supporting at least one of the plurality of cables; and
        a threaded rod coupled to a center of the unitary bar on a first end and to the building on a second end wherein the threaded rod is perpendicular to the unitary bar and an equal number of the plurality of cable supports is on each side of the threaded rod.

2. The cable system of claim 1, wherein the each of the plurality of cable supports is configured to support one type of cable.

3. The cable system of claim 2, wherein each of the cable supports have an identifier on the cable support configured to identify the specific type of cable to be supported by the cable support.

4. The cable system of claim 3, wherein the identifier is a color.

5. The cable system of claim 1, wherein the u shaped bracket is dedicated to high speed voice cables and data cabling.

6. The cable system of claim 5, wherein a first cable support supports voice and data (V/D) cables and a second cable support supports a security (SEC) cable, and a third cable support supports a building automation system (BAS), and a fourth cable support supports an audio video (A/V) cable, and a fifth cable support supports a fire alarm cable (F/A).

7. A method for installing a cable system in a building, comprising:
    coupling a plurality of cable hangers throughout the building, the cable hangers having a unitary bar wherein the unitary bar has two supports forming a U-shaped bracket, a threaded rod, a first cable support and a second cable support and wherein, the threaded rod is coupled to a center of the unitary bar on a first end and to the building on a second end wherein the threaded rod is perpendicular to the unitary bar;
    dedicating the first cable support on each of the cable hangers to a first cable;
    dedicating the second cable support on each of the cable hangers to a second cable;
    installing the first cable on the first cable support, wherein installing the first cable on one of the first cable supports comprises placing a portion of the first cable through the open end of the open coiled ring of the first cable support;
    installing the second cable on the second cable support;
    wherein the first cable support and the second cable support each comprise an open coiled ring coupled to a rod, the open coiled ring having a spiral shape surrounding the supported plurality of cables and an open end allowing the installing of cables into the open coiled ring without moving the open coiled ring and supporting each of the plurality of cables directly on the open coiled ring; and
    installing a third cable in the U-shaped bracket.

8. The method of claim 7, wherein installing the first cable on one of the first cable supports further comprises threading an end of the first cable through the open coiled ring of the cable support.

9. The method of claim 7, further comprising providing an indicator on the first cable support to indicate the type of cable of the first cable.

10. The method of claim 9, wherein providing an indicator further comprises painting the first cable support a color.

11. The method of claim 7, wherein installing the first cable further comprises installing voice and data (V/D) cable and installing the second cable further comprises installing security cable (SEC) cable and installing the third cable further comprises installing a building automation system (BAS) cable and a fourth cable support supporting an audio video (A/V), and a fifth cable support supporting a fire alarm cable (F/A).

12. The cable system of claim 1, wherein the unitary bar is a single piece attached to the threaded rod.

13. The method of claim 7, wherein the unitary bar is a single piece attached to the threaded rod.

14. A cable system, comprising:
    a plurality of cable hangers configured to hold a plurality of cables wherein each of the plurality of cable hangers comprise:
        a hanger rod coupled on a first end to a portion of a building;
        a unitary bar having an elongated straight portion extending perpendicular to and coupled to a second end of the hanger rod at a center of the unitary bar, wherein the unitary bar further has two supports forming a U-shaped bracket supporting at least one of the plurality of cables;
        a plurality of cable supports coupled to the unitary bar on each side of the hanger rod, the plurality of cable supports comprising:

an open coiled ring having a spiral shape that surrounds at least one of the plurality of cables and an open end that allows the cable to be installed into the open coiled ring; and a rod having a terminal end and a ring end wherein the rod extends from the ring end perpendicularly relative to a central axis of the open coiled ring and the terminal end couples to the unitary bar.

15. The cable system according to claim 14, wherein a first cable support supports a communication cable, a second cable support supports a pneumatic cable, and a third cable support supports a hydraulic cable.

* * * * *